(12) United States Patent
Lu et al.

(10) Patent No.: US 12,595,213 B2
(45) Date of Patent: Apr. 7, 2026

(54) PREPARATION METHOD OF SUB-MICRON POWDER OF HIGH-ENTROPY NITRIDE VIA NITRIDE THERMAL REDUCTION WITH SOFT MECHANO-CHEMICAL ASSISTANCE

(71) Applicant: North Minzu University, Ningxia (CN)

(72) Inventors: Youjun Lu, Ningxia (CN); Lutong Yang, Ningxia (CN); Xiang Liu, Ningxia (CN); Chuyun Wang, Ningxia (CN); Wuyang Song, Ningxia (CN); Jiahao Xu, Ningxia (CN)

(73) Assignee: North Minzu University, Yinchuan (CN)

( * ) Notice: Subject to any disclaimer, the term of this patent is extended or adjusted under 35 U.S.C. 154(b) by 468 days.

(21) Appl. No.: 18/209,905

(22) Filed: Jun. 14, 2023

(65) Prior Publication Data
US 2024/0124365 A1 Apr. 18, 2024

(30) Foreign Application Priority Data
Oct. 13, 2022 (CN) .......................... 202211253286.5

(51) Int. Cl.
*C04B 35/58* (2006.01)
*C04B 35/626* (2006.01)
*C04B 35/645* (2006.01)

(52) U.S. Cl.
CPC .. *C04B 35/58028* (2013.01); *C04B 35/62625* (2013.01); *C04B 35/62655* (2013.01); *C04B 35/6268* (2013.01); *C04B 35/645* (2013.01)

(58) Field of Classification Search
CPC ........ C04B 35/58028; C04B 35/62625; C04B 35/62655; C04B 35/6268; C04B 35/645; C01B 21/0602
See application file for complete search history.

(56) References Cited

PUBLICATIONS

Moskovskikh, Dmitry, et al. "Extremely hard and tough high entropy nitride ceramics." Scientific reports 10.1 (2020): 19874.*
Liu, Xiang, et al. "Synthesis of (HfZrTiNbTa) N powders via nitride thermal reduction with soft mechano-chemical assistance." Journal of Advanced Ceramics 12.3 (2023).*

* cited by examiner

*Primary Examiner* — Richard M Rump
(74) *Attorney, Agent, or Firm* — MUNCY, GEISSLER, OLDS & LOWE, P.C.

(57) ABSTRACT

A preparation method of submicron powder of high-entropy nitride via nitride thermal reduction with mechano-chemical assistance, comprising material preparation—grinding—activation—preforming—reaction. In the present invention, high-entropy metal nitride and silicon nitride is used as raw materials, soft mechanochemical activation technologies are used to reduce reaction activation energy of the system, thereafter, by thermal reduction of the nitride, high-purity high-entropy nitride powder is prepared with solid phase methods, and the shortage of high-purity high-entropy nitride powder is addressed. There is no impure phase in the $(Hf_{0.2}Zr_{0.2}Ti_{0.2}Nb_{0.2}Ta_{0.2})N$ high entropy powder prepared according to the present invention, and a single phase solid solution of good crystallinity is formed, and distribution of elements and ingredients in the powder is even, no foreign element is present, and oxygen content is controlled to be less than 0.3%.

3 Claims, 3 Drawing Sheets

1 2

PREPARATION METHOD OF SUB-MICRON POWDER OF HIGH-ENTROPY NITRIDE VIA NITRIDE THERMAL REDUCTION WITH SOFT MECHANO-CHEMICAL ASSISTANCE

TECHNICAL FIELD

The present invention relates to the technical field of ultra-high temperature materials and preparation thereof, specifically, a preparation method of sub-micron powder of high-entropy nitride via nitride thermal reduction with soft mechano-chemical assistance.

BACKGROUND TECHNOLOGY

Development of high-entropy metallic nitride ceramics is slow, and the reasons lying behind that are high cost for powder raw material, complex preparation processes and difficulty in obtaining high-entropy metallic nitride powder and ceramic materials of good performance, therefore, it is urgent to find new ways to obtain high quality high-entropy nitride powder and ceramic materials.

At present, during preparation of high-entropy metallic nitride powder, the main problems are that purity of the powder is not high enough, and difficulty in preparing high-purity high-entropy nitride powder is that conventional preparation technologies are complex, involve high cost and low yield, which goes against mass production. For example, Moskovskikh et al used Hf, Zr, Ti, Nb and Ta as raw materials, ground the same in high power ball mills, put the same into chemical reactors filled with nitrogen for nitridation, finally conducted self-propagating combustion to synthesize mixed powder of multiple phases, however, oxygen content is too high, finally, in ceramic bulks sintered in spark plasma sintering calciners there are a large amount of foreign matters of oxide, performance of the ceramics is affected. Furthermore, Jin et al synthesized high-entropy nitride powder by chemical methods, wherein $CrCl_3$, $NbCl_5$, $VCl_3$, $MoCl_5$, $ZrCl_4$ and urea were used as raw materials, mixed for 30 min in a high speed vibration ball mill and calcined at 800° C. in a nitrogen atmosphere and high-entropy metal nitride powder was obtained, and yield of powder obtained with this method is low so this method is not applicable for large scale production.

Therefore, to address the shortage of the high-purity high-entropy nitride powder, a method for producing high-purity high-entropy nitride submicron powder that involves simple processes makes it convenient for large scale production, improves purity of the high-entropy nitride submicron powder, reduces production cost and realizes mass production is desired.

SUMMARY OF INVENTION

The technical problems to be addressed in the present invention are to provide a preparation method of sub-micron powder of high-entropy nitride via nitride thermal reduction with soft mechano-chemical assistance, wherein high-entropy metal oxides and silicon nitride are used as raw materials, soft mechano-chemical activation technologies are used to reduce reaction activation energy of the system, thereafter, by thermal reduction of nitride, high-purity high-entropy nitride powder is prepared with solid phase methods, and the shortage of high purity high entropy nitride at present can be solved.

The present invention provides a preparation method of sub-micron powder of high-entropy nitride via nitride thermal reduction with soft mechano-chemical assistance, wherein the method comprising:

(1) material preparation: mixing ingredients at a molar ratio of $HfO_2$, $ZrO_2$, $TiO_2$, $Nb_2O_5$, $Ta_2O_5$, $Si_3N_4$=2:2: 2:1:1:6 and obtaining a mixed material;

(2) grinding: weighing the mixed material, placing the mixed material in a mixing mill, adding deionized water, until a solid content is 45%~75%, adding zirconia balls with a particle size of 1~3 mm, grinding until the mixed material is dispersed evenly;

(3) activation: placing the mixed material after grinding into a mixing dispenser, conducting soft mechano-chemical activation at a rate of 800~1600 r/min, activation time is 5~20 h, separating the zirconia balls and drying the mixed material;

(4) prefabrication: compacting powder of the mixed material after drying to be loose pieces of 5~20 g with circular cast steel molds, wherein prefabrication pressure is 10~50 MPa, and pressure is maintained for 10~50 s; and (5) reaction: putting the prefabricated loose pieces into a vacuum synthesis furnace, vacuuming the vacuum synthesis furnace, filling $N_2$ shielding air, heating the vacuum synthesis furnace until 1500~2000° C. for synthesis reaction, maintaining reaction temperature for 30~90 min, furnace cooling and obtaining the $(Hf_{0.2}Ti_{0.2}Zr_{0.2}Nb_{0.2}Ta_{0.2})N$ high-entropy powder.

Preferably, in step (1), the molar ratio of the ingredients is $HfO_2$:$ZrO_2$, $TiO_2$, $Nb_2O_5$, $Ta_2O_5$, $Si_3N_4$=2:2:2:1:1:10.

Preferably, in step (2), the solid content is 60% and a ball material ratio is 3:1.

Preferably, in step (3), a rotation speed of the mixing dispenser is 1500 r/min.

Preferably, in step (5), synthesis temperature is 1600° C.

Preferably, in step (5), a heating ratio of the vacuum synthesis furnace is 10~30° C./min.

Working principles of the present invention: in the present invention, first of all, raw materials are mixed evenly as per a certain ratio, a mixing dispenser is used to conduct soft mechano-chemical activation at a speed of 800~1600 r/min, that is, full grinding and dispersion is conducted in the mixing dispenser, so that the submicron powder of $HfO_2$, $ZrO_2$, $TiO_2$, $Nb_2O_5$, $Ta_2O_5$ and $Si_3N_4$ gradually becomes decrystallized, so that reaction activation energy of the system is reduced, reaction activity of the metal oxides and nitride is activated and the synthesis reaction is accelerated.

Formulas of the synthesis reaction are as following:

$$4Si_3N_4+6HfO_2=6HfN+12SiO+5N_2 \qquad (1)$$

$$4Si_3N_4+6TiO_2=6TiN+12SiO+5N_2 \qquad (2)$$

$$4Si_3N_4+6ZrO_2=6ZrN+12SiO+5N_2 \qquad (3)$$

$$5Si_3N_4+3Nb_2O_5=6NbN+15SiO+7N_2 \qquad (4)$$

$$5Si_3N_4+3Ta_2O_5=6TaN+15SiO+7N_2 \qquad (5)$$

$$0.2HfN+0.2TiN+0.2ZrN+0.2NbN+0.2TaN= (Hf_{0.2}Ti_{0.2}Zr_{0.2}Nb_{0.2}Ta_{0.2})N \qquad (6)$$

Beneficial effects of the present invention: the present invention provides a preparation method of submicron powder of high-entropy nitride via nitride thermal reduction with soft mechano-chemical assistance, wherein, high-entropy metal nitride and silicon nitride is used as raw materials, soft mechanochemical activation technologies are used to reduce reaction activation energy of the system, thereafter, by thermal reduction of the nitride, high-purity high-entropy nitride powder is prepared with solid phase methods, and the shortage of high-purity high-entropy nitride powder is addressed. There is no impure phase in the $(Hf_{0.2}Zr_{0.2}Ti_{0.2}Nb_{0.2}Ta_{0.2})N$ high entropy powder prepared according to the present invention, and a single phase solid solution of good crystallinity is formed, and distribution of elements and ingredients in the powder is even, no foreign element is present, and oxygen content is controlled to be less than 0.3%. Distribution of metallic elements in single particles is very even, and the powder is a high-entropy solid solution with evenly distributed Hf, Zr, Ti, Nb and Ta. Appearance of the powder is regular, distribution of particles of the powder is 0.1~1 μm, with an average particle size of 0.49 μm. In the present invention, the high-entropy nitride submicron powder is prepared via nitride thermal reduction with soft mechano-chemical assistance, compared with the product obtained with conventional metal nitride preparation method, the purity is higher, interference of oxygen impurity is avoided, and oxygen content is controlled to be less than 0.3%, which is also critical in obtaining high performance $(Hf_{0.2}Zr_{0.2}Ti_{0.2}Nb_{0.2}Ta_{0.2})$ N high-entropy metal nitride powder.

EMBODIMENTS

Figure 1:
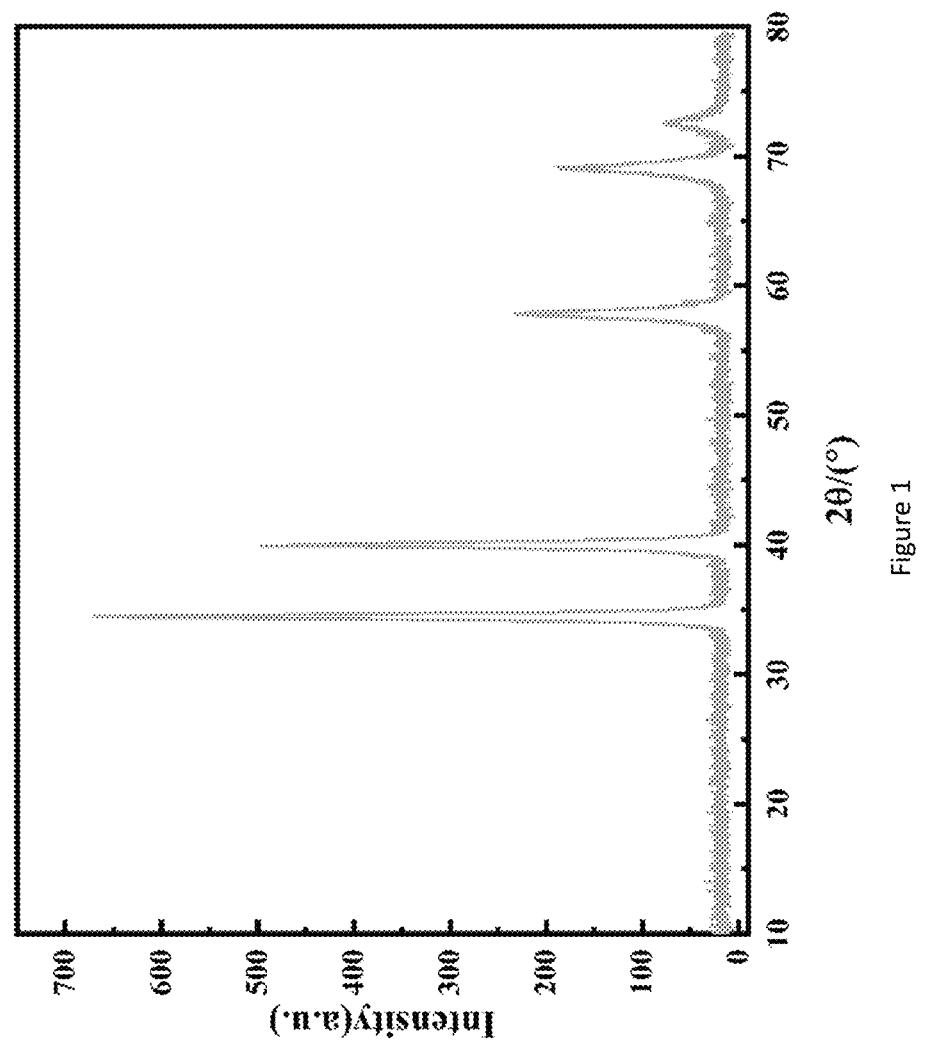
FIG. 1 is an XRD diagram showing $(Hf_{0.2}Zr_{0.2}Ti_{0.2}Nb_{0.2}Ta_{0.2})N$ high-entropy powde.

To make the technical solutions of the present invention easy to understand, hereinafter, a clear and complete description will be given to the technical solutions of the present invention by combination of the drawings and the embodiments.

Embodiment 1

A preparation method of sub-micron powder of high-entropy nitride via nitride thermal reduction with soft mechano-chemical assistance in the present embodiment comprising the following steps:

(1) Material preparation: mixing ingredients at a molar ratio of $HfO_2$, $ZrO_2$, $TiO_2$, $Nb_2O_5$, $Ta_2O_5$, $Si_3N_4$=2:2:2:1:1:6 and obtaining a mixed material;

(2) Grinding: weighing the mixed material, placing the mixed material in a mixing mill, adding deionized water until a solid content is 45%, adding zirconia balls with a particle size of 1~3 mm as per a ball material ratio of 3:1, grinding to have the mixed material evenly dispersed;

(3) Activation: adding the mixed material after grinding into a mixing disperser, conducting soft mechano-chemical activation at a speed of 800 r/min, activation time is 5 h, separating the zirconia balls and drying the mixed material;

(4) Prefabrication: compacting powder of the mixed material after drying to be loose pieces of 5 g with circular cast steel molds with a diameter of 1 mm, preforming pressure is 10 MPa, and pressure is maintained for 50 s;

(5) Reaction: putting the preformed loose pieces into a vacuum synthesis furnace, vacuuming the vacuum synthesis furnace, filling $N_2$ shielding air, heating the vacuum synthesis furnace at a speed of 10~30° C./min until 1500° C. for synthesis reaction, maintaining the temperature and reacting for 90 min, furnace cooling and obtaining $(Hf_{0.2}Ti_{0.2}Zr_{0.2}Nb_{0.2}Ta_{0.2})N$ high entropy powder.

Embodiment 2

A preparation method of sub-micron powder of high-entropy nitride via nitride thermal reduction with soft mechano-chemical assistance in the present embodiment, comprising the following steps:

(1) Material preparation: mixing ingredients as per a molar ratio of $HfO_2$, $ZrO_2$, $TiO_2$, $Nb_2O_5$, $Ta_2O_5$, $Si_3N_4$=2:2:2:1:1:8 and obtaining a mixed material;

(2) Grinding: weighing the mixed material, putting into a mixing mill, adding deionized water of an appropriate amount so that a solid content is 50%, adding zirconia balls with a particle size of 1~3 mm as per a ball material ratio of 3:1, grinding to have materials evenly dispersed;

(3) Activation: putting the mixed material after grinding into a mixing dispenser, conducting soft mechano-chemical activation at a speed of 1000 r/min, activation time is 8 h, separating the zirconia balls and drying the mixed material;

(4) Preforming: compacting powder of the mixed material to be loose pieces of 10 g by circular cast steel molds with a diameter of 1 mm, preforming pressure is 200 MPa and pressure is maintained for 40 s;

(5) Reaction: putting the preformed loose pieces into a vacuum synthesis furnace, vacuuming the vacuum synthesis furnace, filling $N_2$ shielding air, heating the vacuum synthesis furnace as per a speed of 10~30° C./min until 1700° C. for synthesis reaction, maintaining the temperature and reacting for 75 min, furnace cooling and obtaining $(Hf_{0.2}Ti_{0.2}Zr_{0.2}Nb_{0.2}Ta_{0.2})N$ high entropy powder.

Embodiment 3

A preparation method of sub-micron powder of high-entropy nitride via nitride thermal reduction with soft mechano-chemical assistance in the present embodiment comprising the following steps:

(1) Material preparation: mixing ingredients as per a molar ratio of $HfO_2$, $ZrO_2$, $TiO_2$, $Nb_2O_5$, $Ta_2O_5$, $Si_3N_4$=2:2:2:1:1:10 and obtaining a mixed material;

(2) Grinding: weighing the mixed material, putting into a mixing mill, adding deionized water until a solid content is 60%, adding zirconia balls with a particle diameter of 1~3 mm as per a ball material ratio of 3:1, grinding to have materials dispersed evenly;

(3) Activation: putting the mixed material after grinding into a mixing dispenser, conducting soft mechano-chemical activation at a speed of 1200 r/min, activation time is 12 h, separating the zirconia balls and drying the mixed material;

(4) Preforming: compacting powder of the mixed material after drying to be loose pieces with a mass of 15 g with circular cast steel molds with a diameter of 1 mm, preforming pressure is 30 MPa and pressure is maintained for 30 s;

(5) Reaction: putting the preformed loose pieces into a vacuum synthesis furnace, vacuuming the vacuum synthesis furnace, filling $N_2$ shielding air, heating the vacuum synthesis furnace as per a heating rate of 10~30° C./min until 1600° C. for synthesis reaction, maintaining the temperature and reacting for 60 min, furnace cooling and obtaining $(Hf_{0.2}Ti_{0.2}Zr_{0.2}Nb_{0.2}Ta_{0.2})N$ high entropy powder.

Embodiment 4

A preparation method of sub-micron powder of high-entropy nitride via nitride thermal reduction with soft mechano-chemical assistance in the present embodiment comprising the following steps:

(1) Material preparation: mixing ingredients as per a molar ratio of $HfO_2$, $ZrO_2$, $TiO_2$, $Nb_2O_5$, $Ta_2O_5$, $Si_3N_4$=2:2:2:1:1:12 and obtaining a mixed material;

(2) Grinding: weighing the mixed material, putting into a mixing mill, adding deionized water until a solid content is 70%, adding zirconia balls with a particle size of 1~3 mm as per a ball material ratio of 3:1, and grinding to have the ingredients dispersed evenly;

(3) Activation: putting the mixed material after grinding into a mixing dispenser, conducting soft mechano-chemical activation at a speed of 1400 r/min, activation time 15 h, separating the zirconia balls and drying the mixed material;

(4) Preforming: compacting the mixed material after drying to be loose pieces with a mass of 18 g with circular cast steel molds with a diameter of 1 mm, preforming pressure is 40 MPa and pressure is maintained for 20 s;

(5) Reaction: putting the preformed loose pieces into a vacuum synthesis furnace, vacuuming the vacuum synthesis furnace, filling $N_2$ shielding air, heating the vacuum synthesis furnace until 1800° C. at a heating rate of 10~30° C./min for synthesis reaction, maintaining the temperature and reacting for 45 min, furnace cooling and obtaining $(Hf_{0.2}Ti_{0.2}Zr_{0.2}Nb_{0.2}Ta_{0.2})N$ high entropy powder.

Embodiment 5

A preparation method of sub-micron powder of high-entropy nitride via nitride thermal reduction with soft mechano-chemical assistance in the present embodiment comprising the following steps:

(1) Material preparation: mixing ingredients as per a molar ratio of $HfO_2$, $ZrO_2$, $TiO_2$, $Nb_2O_5$, $Ta_2O_5$, $Si_3N_4$=2:2:2:1:1:14 and obtaining a mixed material;

(2) Grinding: weighing the mixed material, putting into a mixing mill, adding deionized water until a solid content is 75%, adding zirconia balls with a particle size of 1~3 mm at a ball material ratio of 3:1, grinding to have the ingredients dispersed evenly;

(3) Activation: putting the mixed material after grinding into a mixing dispenser, conducting soft mechano-chemical activation at a speed of 1600 r/min, activation time is 20 h, separating the zirconia balls and drying the mixed material;

(4) Preforming: compacting powder of the mixed material to be loose pieces with a mass of 20 g with circular cast steel molds with a diameter of 1 mm, preforming pressure is 50 MPa and pressure if maintained for 10 s;

(5) Reaction: putting the preformed loose pieces into a vacuum synthesis furnace, vacuuming the vacuum synthesis furnace, filling $N_2$ shielding air, heating the vacuum synthesis furnace until 2000° C. at a heating rate of 10~30° C./min for synthesis reaction, maintaining the temperature and reacting for 30 min, furnace cooling and obtaining $(Hf_{0.2}Ti_{0.2}Zr_{0.2}Nb_{0.2}Ta_{0.2})N$ high entropy powder.

Figure 2:
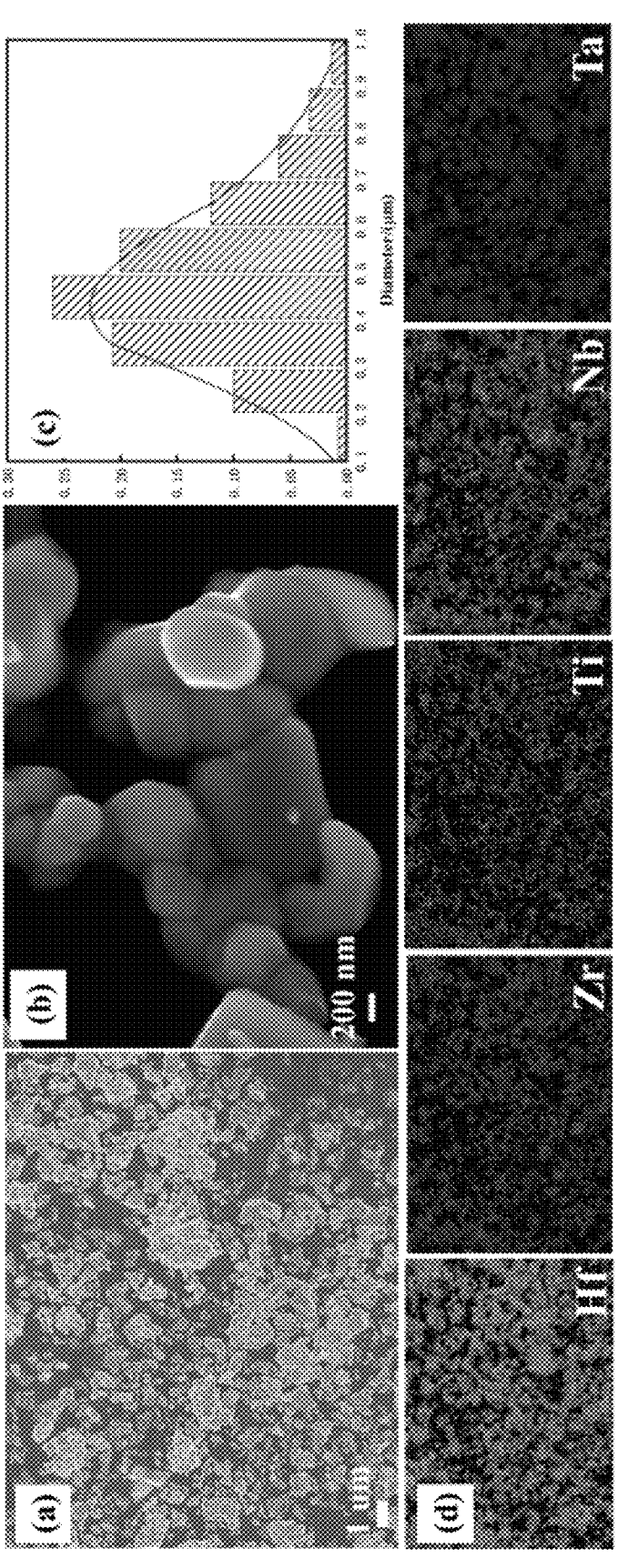
FIG. 2 shows SEM particle size analysis and energy dispersive spectroscopy analysis.
Figure 3:
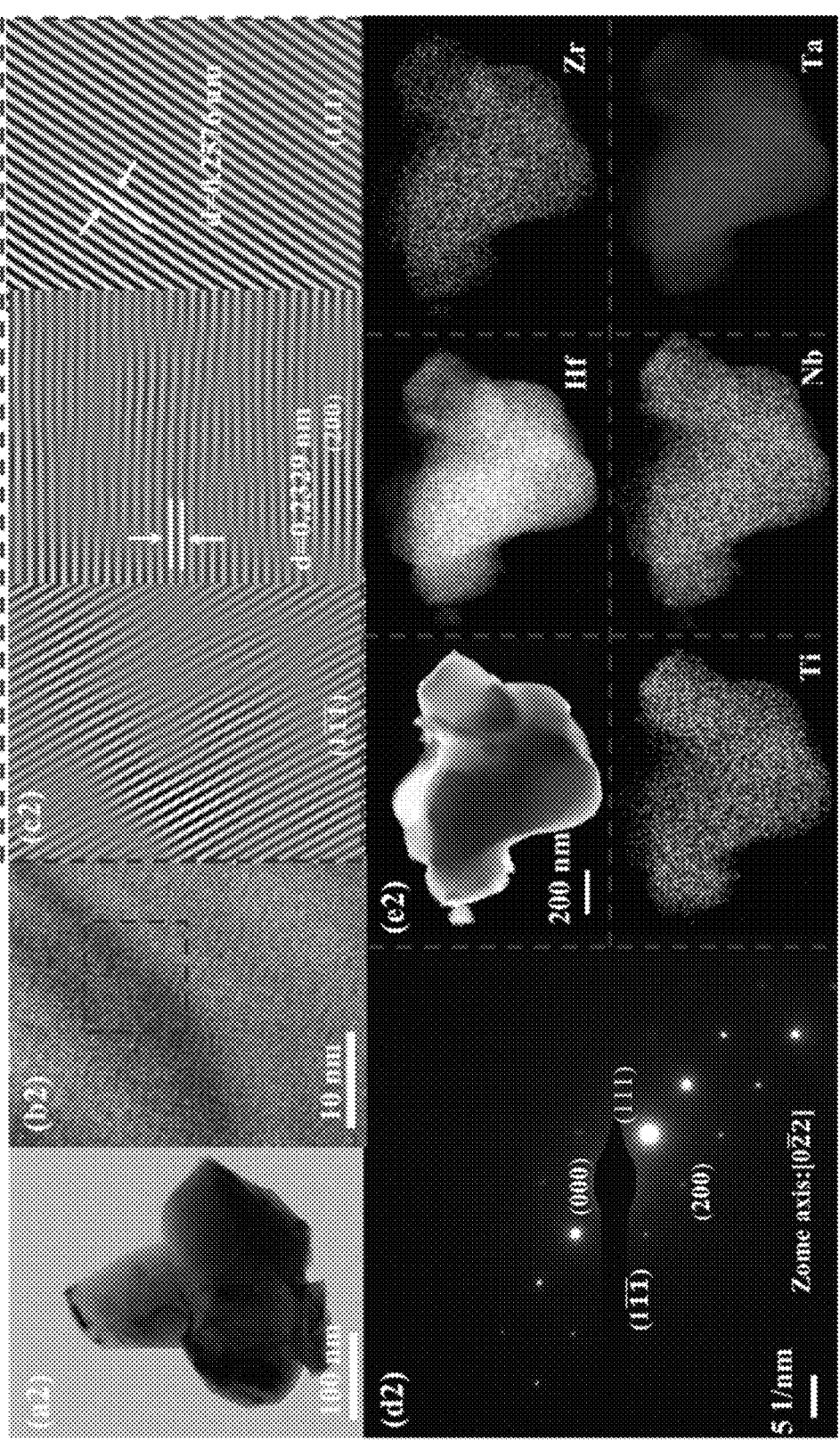
FIG. 3 shows transmission electron diffraction (TED) and energy dispersive spectroscopy analysis.

Characterization was given to the $(Hf_{0.2}Zr_{0.2}Ti_{0.2}Nb_{0.2}Ta_{0.2})N$ high-entropy powder, FIG. 1 is an XRD diagram of the $(Hf_{0.2}Zr_{0.2}Ti_{0.2}Nb_{0.2}Ta_{0.2})N$ high-entropy powder, FIG. 2 shows SEM particle size analysis and energy dispersive spectroscopy analysis and FIG. 3 shows transmission electron diffraction (TED) and energy dispersive spectroscopy analysis.

From the phase analysis in FIG. 1, it can be known that there was no impure phase in the $(Hf_{0.2}Zr_{0.2}Ti_{0.2}Nb_{0.2}Ta_{0.2})N$ high-entropy powder, single-phase solid solution was formed with good crystailinity, and oxygen content was controlled to be less than 0.3%. By analyzing the XRD data it can be known that the lattice parameter was 4.5045 Å, and the average crystallite size was calculated to be 35 nm according to Scherrer Equation.

From the appearance as shown in FIG. 2, it can be known that the powder was of regular appearances, with few soft reunions. By calculating the particle size of the powder, a particle size distribution diagram FIG. 2(*c*) was obtained, a particle distribution range of the powder was 0.1~1 m with an average particle size of 0.49 μm. By conducting elemental analysis for the powder from a macro perspective, it was known that distribution of elements and ingredients was uniform and no impure element exists.

As shown in FIG. 3, to further analyze the high entropy nitride powder, transmission electron diffraction (TED) and energy dispersive spectroscopy analysis was given to samples of the powder. Some particles in the powder had sizes about 200 nm, a large quantity of dislocations existed in irregular places in the surface, which was caused by a large number of distortion of lattice during formation of the solid solution, resulting in a large number of dislocation, dislocation overlapping resulted in irregular particle surface, and some step-like growth morphologies appeared. By analysis of electron diffraction mottles it can be known that the solid solution was of cubic phase, which matched the data and results in XRD analysis. Finally elemental analysis was given to single particles, it was found that, distribution of metallic elements in the particles was uniform, and the powder was solid solution with evenly distributed Hf, Zr, Ti, Nb and Ta metallic elements.

From the foregoing analysis, it can be concluded that, particle sizes of the single-phase $(Hf_{0.2}Zr_{0.2}Ti_{0.2}Nb_{0.2}Ta_{0.2})N$ high-entropy powder prepared via thermal reduction of nitride with mechano-chemical assistance fall into the submicron level, and distribution of metallic elements is even.

It shall be understood that, the embodiments given here are only some embodiments of the present invention rather than all, the embodiments are exemplary, and intended to provide a clear and obvious way to help understanding the contents of the present invention and shall be not construed to be limitations on the present invention. Without departing from the spirit of the present invention, all other embodiments that those of ordinary skill can obtain without paying creative effort and simple replacement and all variations of the technical solutions of the present invention shall fall into the protection scope of the present invention.

The invention claimed is:

1. A preparation method of sub-micron powder of $(Hf_{0.2}Ti_{0.2}Zr_{0.2}Nb_{0.2}Ta_{0.2})N$ high-entropy powder via nitride thermal reduction with soft mechano-chemical assistance, wherein the method comprises:

(1) material preparation: mixing ingredients at a molar ratio of $HfO_2:ZrO_2:TiO_2:Nb_2O_5:Ta_2O_5:Si_3N_4=2:2:2:1:1:(6-14)$ and obtaining a mixed material;

(2) grinding: weighing the mixed material, placing the mixed material in a mixing mill, adding deionized water, until a solid content is 45%~75%, adding zirconia balls with a particle size of 1~3 mm, grinding until the mixed material is dispersed evenly;

(3) activation: placing the mixed material after grinding into a mixing dispenser, conducting soft mechano-chemical activation at a rate of 800~1600 r/min, activation time is 5~20 h, separating the zirconia balls and drying the mixed material;

(4) prefabrication: compacting powder of the mixed material after drying to be loose pieces of 5~20 g with circular cast steel molds, wherein prefabrication pressure is 10~50 MPa, and pressure is maintained for 10~50 s; and (5) reaction: putting the prefabricated loose pieces into a vacuum synthesis furnace, vacuuming the vacuum synthesis furnace, filling $N_2$ shielding air, heating the vacuum synthesis furnace until 1500~2000° C. for synthesis reaction, maintaining reaction temperature for 30~90 min, furnace cooling and obtaining the $(Hf_{0.2}Ti_{0.2}Zr_{0.2}Nb_{0.2}Ta_{0.2})N$ high-entropy powder.

2. The preparation method of sub-micron powder of high-entropy nitride via nitride thermal reduction with soft mechano-chemical assistance according to claim 1, wherein in step (1), the molar ratio of the ingredients is $HfO_2:ZrO_2:TiO_2:Nb_2O_5:Ta_2O_5:Si_3N_4=2:2:2:1:1:10$.

3. The preparation method of sub-micron powder of high-entropy nitride via nitride thermal reduction with soft mechano-chemical assistance according to claim 1, wherein in step (3), the rate is 1500 r/min.

* * * * *